(12) United States Patent
Nohara

(10) Patent No.: US 10,088,777 B2
(45) Date of Patent: Oct. 2, 2018

(54) ROTATION DETECTION DEVICE, TONER CONVEYANCE DEVICE, AND IMAGE FORMING APPARATUS INCLUDING THE SAME

(71) Applicant: KYOCERA Document Solutions Inc., Osaka (JP)

(72) Inventor: Yuta Nohara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 143 days.

(21) Appl. No.: 15/424,308

(22) Filed: Feb. 3, 2017

(65) Prior Publication Data

US 2017/0242368 A1 Aug. 24, 2017

(30) Foreign Application Priority Data

Feb. 19, 2016 (JP) .................................. 2016-029869

(51) Int. Cl.
*G01P 3/486* (2006.01)
*G03G 15/08* (2006.01)
(Continued)

(52) U.S. Cl.
CPC .......... *G03G 15/0891* (2013.01); *G01P 3/486* (2013.01); *H04N 1/00037* (2013.01);
(Continued)

(58) Field of Classification Search
CPC ....... G01D 5/342; G01D 5/3473; G01P 3/486
See application file for complete search history.

(56) References Cited

U.S. PATENT DOCUMENTS 3,757,128 A * 9/1973 Vermeulen .............. G01P 3/486
250/231.16
5,949,067 A * 9/1999 Sano ....................... G01D 5/36
250/231.13

(Continued)

FOREIGN PATENT DOCUMENTS

JP 60227119 A * 11/1985 ............... G01D 5/36
JP 10190984 A * 7/1998
(Continued)

*Primary Examiner* — Clayton E Laballe
*Assistant Examiner* — Leon W Rhodes, Jr.
(74) *Attorney, Agent, or Firm* — Stein IP, LLC

(57) ABSTRACT

A rotation detection device includes a light emitting portion, a light-passing control member, and a light receiving portion. The light-passing control member controls passing of the light from the light emitting portion. The light receiving portion outputs a light receiving signal based on the light received by the respective light receiving elements as detection signals representing detection results of the rotation by the rotator. A first virtual extended line that extends the first opening margin and a light-receiving-portion center line along the first direction passing through the respective light receiving elements at the light receiving portion pass through positions shifted from a rotational center of the light-passing control member. The light receiving portion is arranged such that the first virtual extended line corresponds to the light-receiving-portion center line, when the first opening margin passes through an optical path from the light emitting portion to the light receiving portion.

5 Claims, 7 Drawing Sheets

(51) Int. Cl.
*G03G 21/00* (2006.01)
*H04N 1/00* (2006.01)
*H04N 1/04* (2006.01)

(52) U.S. Cl.
CPC ........... *H04N 1/00058* (2013.01); *H04N 1/04* (2013.01); *G03G 15/0855* (2013.01); *G03G 15/0862* (2013.01); *H04N 2201/0082* (2013.01)

(56) References Cited

U.S. PATENT DOCUMENTS

| | | | |
|---|---|---|---|
| 9,758,327 B2 * | 9/2017 | Suzuki | G01D 5/34 |
| 2016/0257144 A1 * | 9/2016 | Uchida | B41J 11/42 |

FOREIGN PATENT DOCUMENTS

| | | | | |
|---|---|---|---|---|
| JP | 2004109074 A | * | 4/2004 | |
| JP | 2012-198359 A | | 10/2012 | |

* cited by examiner

ROTATION DETECTION DEVICE, TONER CONVEYANCE DEVICE, AND IMAGE FORMING APPARATUS INCLUDING THE SAME

INCORPORATION BY REFERENCE

This application is based upon, and claims the benefit of priority from, corresponding Japanese Patent Application No. 2016-029869 filed in the Japan Patent Office on Feb. 19, 2016, the entire contents of which are incorporated herein by reference.

BACKGROUND

Unless otherwise indicated herein, the description in this section is not prior art to the claims in this application and is not admitted to be prior art by inclusion in this section.

A typical image forming apparatus such as a copier that uses an electrophotographic method includes a drive motor that rotationally drives and various rotators that rotate by driving power of the drive motor. For example, a toner conveyance device, which conveys toner to a developing device that supplies the toner to a photoreceptor drum to form a toner image on this photoreceptor drum, includes a conveying member that conveys the toner with rotating, as rotators.

At such toner conveyance device included in the image forming apparatus, for example, when an image forming operation has not been performed over a long period of time, the toner may condense in a toner conveyance passage through which the conveying member conveys the toner to decrease conveyability of the toner in the toner conveyance passage. An amount of the toner housed in the toner conveyance passage possibly fluctuates. Accordingly, if the amount of the toner is excessively large, the conveyability of the toner in the toner conveyance passage will decrease. When attempting to convey the toner to the developing device in such state, step-out phenomenon may occur at the drive motor that rotationally drives the conveying member as the rotator. The step-out is phenomenon where synchronization of a driving control signal and rotation of the drive motor is lost to disturb control of the drive motor when overload acts on the drive motor or when a rotation speed rapidly changes.

As a configuration in order to prevent the step-out phenomenon from occurring at the drive motor, an image forming apparatus including a rotation detection device that detects rotation of a rotator has been proposed. This image forming apparatus includes a conveying member, a drive motor, a disc-shaped pulse plate, and a Photo Interrupter Sensor (PI sensor). The conveying member conveys toner. The drive motor rotationally drives the conveying member. The pulse plate is installed at a motor output shaft of the drive motor. The PI sensor includes a light emitting portion and a light receiving portion located opposed to one another with across the pulse plate.

At the rotation detection device included in the image forming apparatus, a plurality of slits (openings) that radially extend along a radial direction are formed at the pulse plate at equiangular intervals. Then, at the light receiving portion that outputs a light receiving signal as a detection signal representing a rotation detection result, the PI sensor is arranged such that a virtual center line that passes through respective light receiving elements passes through a rotational center of the pulse plate. That is, the PI sensor is arranged outward in the radial direction of the pulse plate such that the light receiving portion extends along the radial direction of the pulse plate. This rotation detection device ensures determination whether the drive motor rotates or its rotation has been stopped due to the step-out, based on the light receiving signal output from the light receiving portion at the PI sensor.

SUMMARY

A rotation detection device according to one aspect of the disclosure detects rotation centering a rotation shaft of a rotator including the rotation shaft. The rotation detection device includes a light emitting portion, at least one light-passing control member, and a light receiving portion. The light emitting portion emits light. The light-passing control member is located to rotate integrally with the rotation shaft to rotate in conjunction with rotation of the rotator to control passing of the light from the light emitting portion. The light-passing control member includes a light shielding portion and a light-passing opening through which the light from the light emitting portion passes. The light receiving portion is located opposed to the light emitting portion with across the light-passing control member. A plurality of light receiving elements receive light that has passed through the light-passing opening corresponding to rotation of the light-passing control member. The plurality of light receiving elements are arranged along a first direction on the light receiving portion, and the light receiving portion outputting a light receiving signal based on the light received by the respective light receiving elements as detection signals representing detection results of the rotation by the rotator. A first opening margin at a downstream side of a rotation direction forms one straight line at the light-passing opening of the light-passing control member. A first virtual extended line that extends the first opening margin and a light-receiving-portion center line along the first direction passing through the respective light receiving elements at the light receiving portion pass through positions shifted from a rotational center of the light-passing control member, in plan view viewing the light-passing control member from an axial direction of the rotation shaft. The light receiving portion is arranged such that the first virtual extended line corresponds to the light-receiving-portion center line, when the first opening margin passes through an optical path from the light emitting portion to the light receiving portion by the rotation of the light-passing control member.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
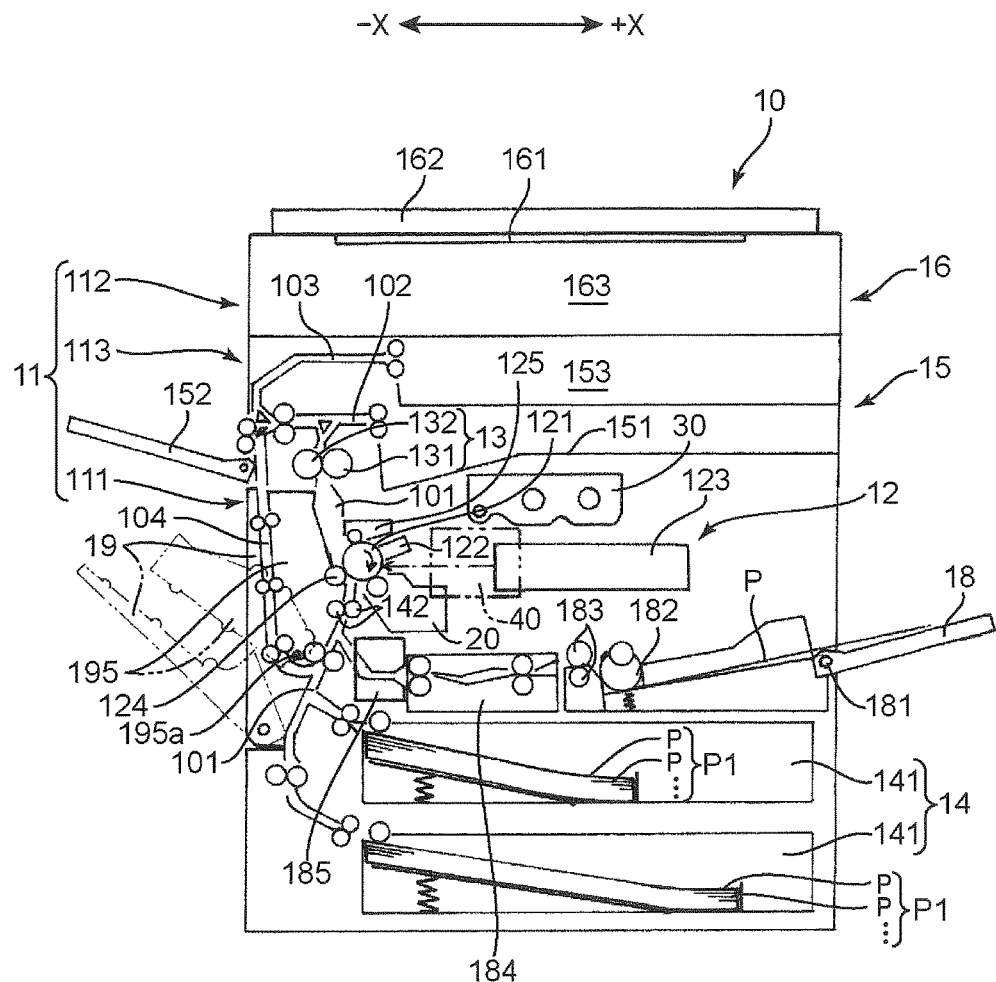
FIG. 1 schematically illustrates an internal structure of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a rotation detection device, and a toner conveyance device and an image forming apparatus according to one embodiment of the disclosure based on the drawings. FIG. 1 schematically illustrates an internal structure of an image forming apparatus 10 according to the one embodiment of the disclosure.

The image forming apparatus 10, which is what is called an in-barrel paper discharge type copier, includes an image forming unit 12, a fixing unit 13, a paper sheet storage unit 14, a paper sheet discharge unit 15, and an image reading unit 16 at an apparatus main body 11. Then, a part of the apparatus main body 11 is depressed at a lower portion of the image reading unit 16 to form the paper sheet discharge unit 15. Accordingly, this image forming apparatus 10 is referred to as the in-barrel paper discharge type.

The apparatus main body 11 includes a lower chassis 111, an upper chassis 112, and a connecting portion 113. The lower chassis 111 has a rectangular parallelepiped shape in an external appearance view. The upper chassis 112 has a flat rectangular parallelepiped shape located above and opposed to this lower chassis 111. The connecting portion 113 is interposed between these upper chassis 112 and lower chassis 111. The connecting portion 113, which is a construction for connecting the lower chassis 111 to the upper chassis 112 in a state where the paper sheet discharge unit 15 is formed between the lower chassis 111 and the upper chassis 112, is located upright from a left side portion of the lower chassis 111. The upper chassis 112 is supported by an upper end portion of the connecting portion 113 where a left side portion of the upper chassis 112 hangs.

Then, the image forming unit 12, the fixing unit 13, and the paper sheet storage unit 14 are internally mounted on the lower chassis 111. The image reading unit 16 is mounted on the upper chassis 112.

The paper sheet storage unit 14 includes a paper sheet cassette 141 insertable and removable with respect to the apparatus main body 11. A paper bundle P1 is accumulated in this paper sheet cassette 141. Then, when an image formation process is performed, paper sheets P are brought up one by one from this paper bundle P1 to be sent into the image forming unit 12, thus a printing process is performed on this paper sheet P. In this embodiment, the paper sheet cassettes 141 are located at two stages.

The paper sheet discharge unit 15 is formed between the lower chassis 111 and the upper chassis 112. This paper sheet discharge unit 15 includes an in-barrel sheet discharge tray 151 formed on a top surface of the lower chassis 111. The paper sheet P on which a toner image is transferred from the image forming unit 12 is discharged from a lower portion of the connecting portion 113 toward this in-barrel sheet discharge tray 151.

The image reading unit 16 includes a contact glass 161, an openable/closable document pressing cover 162, and an optical system 163. The contact glass 161 is mounted on a top surface opening of the upper chassis 112, and on which a document is placed. The document pressing cover 162 is placed on this contact glass 161 to press the document. The optical system 163 includes a scanning mechanism that scans an image of the document placed on the contact glass 161.

Then, analog information of the document image read by the optical system 163 is converted into a digital signal to be output toward an exposure apparatus 123, which is described later, thus the digital signal is provided for the image formation process.

At a right side surface (a surface in a +X direction in FIG. 1) of the lower chassis 111, a bypass tray 18 is located at a position immediately above the paper sheet storage unit 14. This bypass tray 18 is turnably journaled by a support shaft 181 at a lower portion. The bypass tray 18 is configured to change a posture between a closed posture that stands in order to close a bypass paper feeding port and an opened posture that projects toward a right side. This bypass tray 18 is provided for feeding the paper sheets P one by one by hand, in a state set at the opened posture.

A conveyance unit 184 and a relay unit 185 are located between such bypass tray 18 and a photoreceptor drum 121 (an image carrier), which is described later, of the image forming unit 12. The paper sheet P fed from the bypass tray 18 by hand is sent out toward a nip portion between the photoreceptor drum 121 and a transfer roller 124, which is described later, via these conveyance unit 184 and relay unit 185.

At a left side surface (a surface in a −X direction in FIG. 1) of the lower chassis 111, an openable/closable maintenance door 19 for maintenance is located. An openable/closable out-barrel sheet discharge tray 152 is located at a position immediately above this maintenance door 19. The paper sheet P on which the image formation process has been completed at the image forming unit 12 is selectively discharged to any of this out-barrel sheet discharge tray 152 and the in-barrel sheet discharge tray 151.

The image forming unit 12 includes the photoreceptor drum 121 at an approximately center portion in a vertical direction and a position slightly near a left side. This photoreceptor drum 121 rotates centering a drum center in a clockwise direction to be electrically charged by a charging apparatus 122 evenly on a circumference surface. The charging apparatus 122 is located at a position immediately right side of the photoreceptor drum 121.

Then, a laser beam based on image information of the document image read at the image reading unit 16, from the exposure apparatus 123 forms an electrostatic latent image on the circumference surface of the photoreceptor drum 121. Developer (hereinafter referred to as toner) is supplied toward this electrostatic latent image from a developing device 20 located below the photoreceptor drum 121 to form a toner image on the circumference surface of the photoreceptor drum 121.

In a space between the exposure apparatus 123 and the in-barrel sheet discharge tray 151, a toner container 30 is attachably/detachably mounted. At a front position in the lower chassis 111 between the toner container 30 and the developing device 20, a toner conveyance device 40 that functions as an intermediate hopper is arranged. Then, the toner in the toner container 30 is replenished to the developing device 20 via this toner conveyance device 40. The toner conveyance device 40 will be described in detail later.

The paper sheet P sent out from any of the paper sheet cassettes 141 of the paper sheet storage unit 14 is sent into the photoreceptor drum 121, on which the toner image is formed by the toner supplied from the developing device 20, via a paper sheet vertical conveyance path 101 and pair of registration rollers 142. Then, the toner image on the circumference surface of the photoreceptor drum 121 is transferred onto this paper sheet P by action of the transfer roller 124 located opposed to this photoreceptor drum 121 at a left side of the photoreceptor drum 121. The paper sheet P onto which the toner image has been transferred is separated from the photoreceptor drum 121 to be sent into the fixing unit 13.

The photoreceptor drum 121 where the transfer process of the toner image onto the paper sheet P has been completed continues to rotate in the clockwise direction, thus a cleaning device 125 located at a position immediately above the photoreceptor drum 121 performs a clean process on the circumference surface of the photoreceptor drum 121. Subsequently, the photoreceptor drum 121 will head for the charging apparatus 122 for the next image formation process.

The fixing unit 13 includes a fixing roller 131 and a pressure roller 132. The fixing roller 131 includes a heating element. The pressure roller 132 is located opposed to this fixing roller 131 at a left side. Then, the paper sheet P sent from the image forming unit 12 passes through a nip portion between these fixing roller 131 and pressure roller 132 to obtain heat, thus a fixing process of the toner image is performed.

The paper sheet P after the fixing process is selectively discharged to the in-barrel sheet discharge tray 151 of the paper sheet discharge unit 15 or discharged to the out-barrel sheet discharge tray 152 via a discharge conveyance path 102 located above the fixing unit 13, when this paper sheet P is for single-side printing.

On the other hand, when the paper sheet P after the fixing process is for duplex printing where a single-side printing process has been completed, after a first half of the paper sheet P is discharged to a temporal save space 153, which is formed above the in-barrel sheet discharge tray 151, via a back and forth conveyance path 103, which is located above the discharge conveyance path 102, the paper sheet P is inversely sent via an inverse conveyance path 104. Continuously, the paper sheet P is supplied to the image forming unit 12 again in a state where the front and back of the paper sheet P is inverted, thus the image formation process is performed on the back surface side. The paper sheet P where the duplex printing has been completed is discharged to the sheet discharge tray 151 or the out-barrel sheet discharge tray 152.

The lower chassis 111 includes a cover member 195 openable/closable with respect to the image forming unit 12, at an immediately inside of the maintenance door 19. This cover member 195 is arranged in a state being wrapped by a right side surface of the closed maintenance door 19. This cover member 195 is turnably journaled by a spindle 195a, which is supported by the lower chassis 111 at a lower end portion in a state where this lower end portion is positioned slightly above a lower end portion of the maintenance door 19. Then, such cover member 195 positively and inversely turns around the spindle 195a to be configured to change a posture between a closed posture (indicated in a solid line in FIG. 1) that has closed a left side surface of the image forming unit 12 and an opened posture (indicated in a two-dot chain line in FIG. 1) that has opened this left side surface.

Then, in the state where the cover member 195 is set at the closed posture, at a right side surface side of this cover member 195, the paper sheet vertical conveyance path 101 for conveying the paper sheet P fed from the paper sheet cassettes 141 and the bypass tray 18 is formed.

Such cover member 195 is located for changing the posture of the cover member 195 to the opened posture to expose the stuck paper sheet P outside for removing, when paper jamming occurs in the paper sheet vertical conveyance path 101 corresponding to the left side surface of the image forming unit 12.

Between the right side surface of the maintenance door 19 set at the closed posture and a left side surface of the cover member 195 set at the closed posture, the inverse conveyance path 104 for inversely sending the paper sheet P where the printing process is performed only on a single-side, when performing the duplex printing on the paper sheet P, is formed. The paper sheet P inversely sent along this inverse conveyance path 104 is introduced into the paper sheet vertical conveyance path 101 below the photoreceptor drum 121 in a state where the front and back of the paper sheet P is inverted, thus the printing process is performed on the back surface side of this paper sheet P. The paper sheet P where the duplex printing has been completed is discharged to the in-barrel sheet discharge tray 151 or the out-barrel sheet discharge tray 152.

Then, in this embodiment, the paper sheet P fed from the bypass tray 18 by hand is brought up toward the left side by driving of a feeding roller 182, which is located at a far side portion (a left side) of this bypass tray 18, to be introduced to a position slightly below the photoreceptor drum 121 in the paper sheet vertical conveyance path 101 via pair of conveyance rollers 183, the conveyance unit 184, and the relay unit 185.

Figure 2:
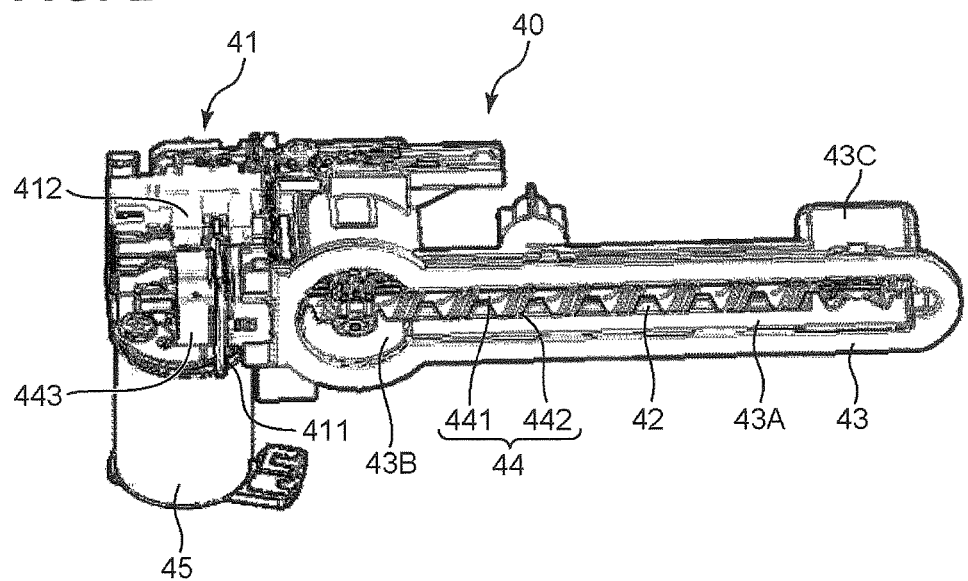
FIG. 2 illustrates a configuration of a toner conveyance device according to the one embodiment.
Figure 3:
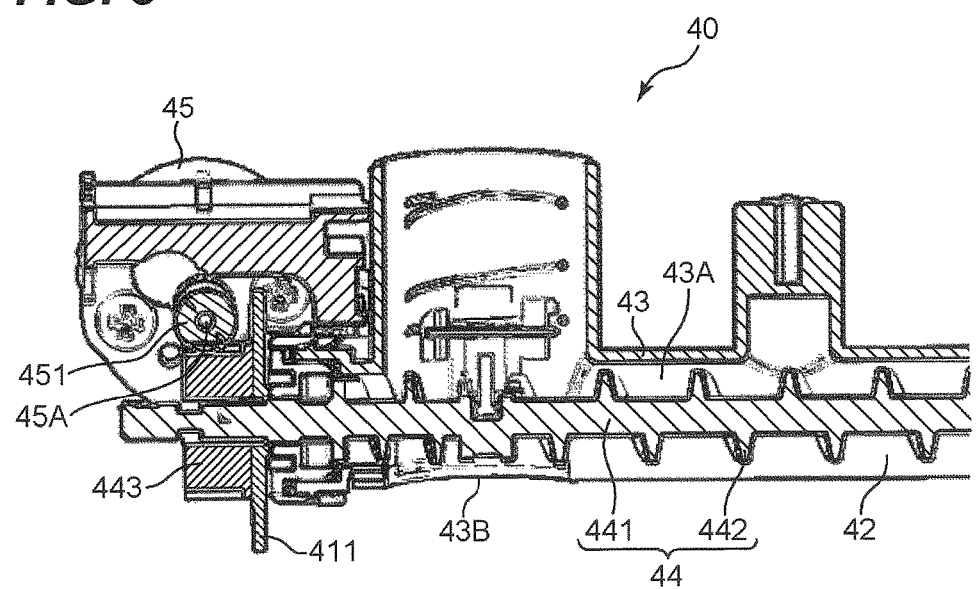
FIG. 3 illustrates a cross section of an enlarged main part of the toner conveyance device according to the one embodiment.
Figure 4:
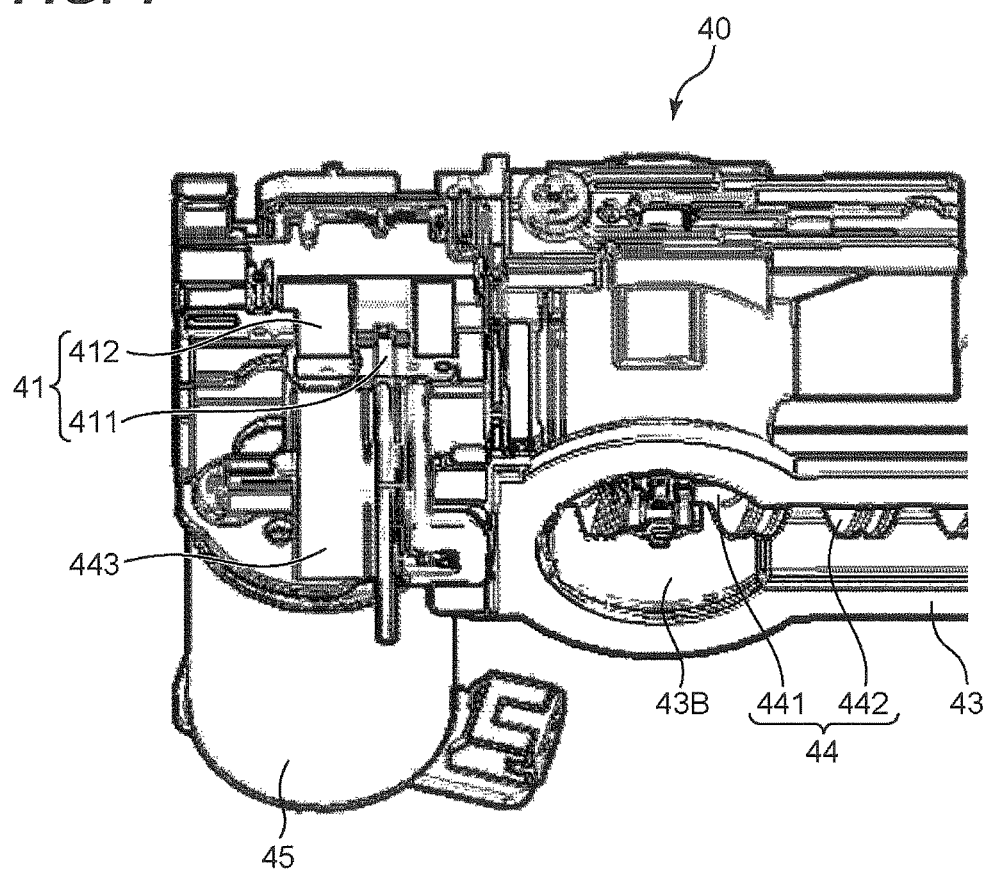
FIG. 4 illustrates an enlarged main part of the toner conveyance device according to the one embodiment.
Figure 5:
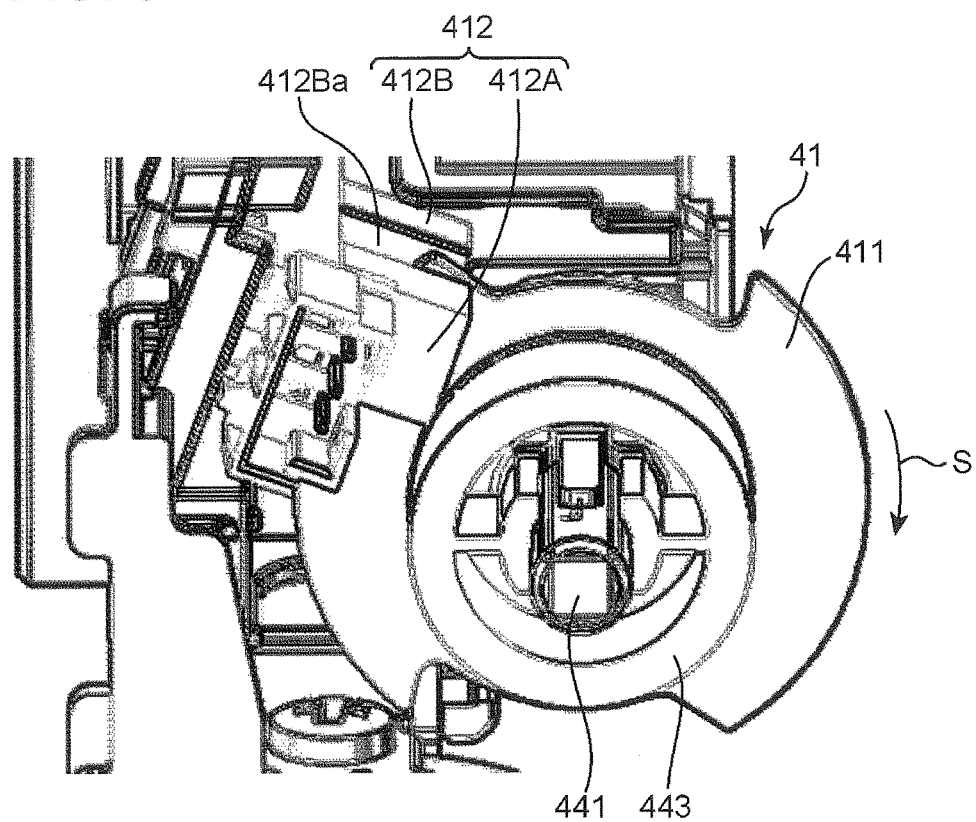
FIG. 5 illustrates an enlarged proximity of a rotation detection device included in the toner conveyance device according to the one embodiment.
Figure 6:
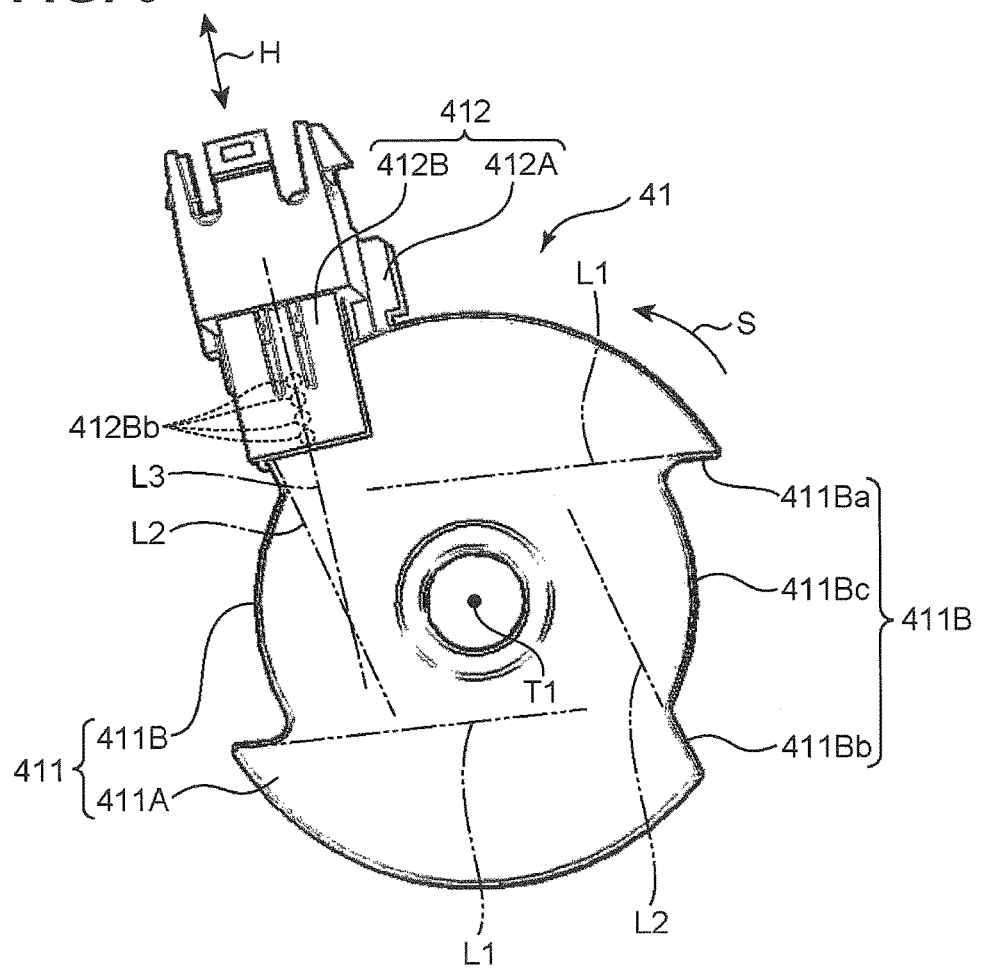
FIG. 6 illustrates a configuration of the rotation detection device according to the one embodiment.
Figure 7A:
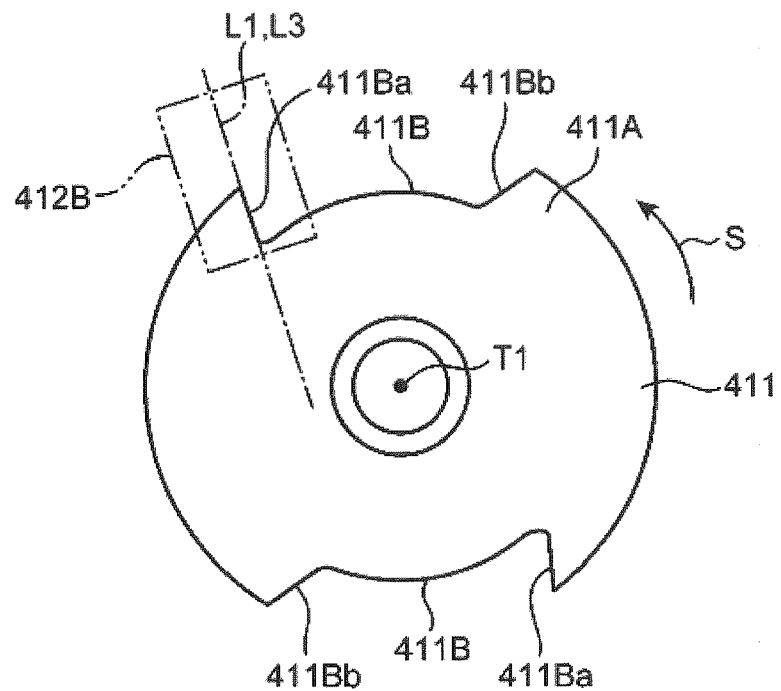
FIGS. 7A and 7B illustrate locations with respect to a pulse plate of a PI sensor at the rotation detection device according to the one embodiment.
Figure 7B:
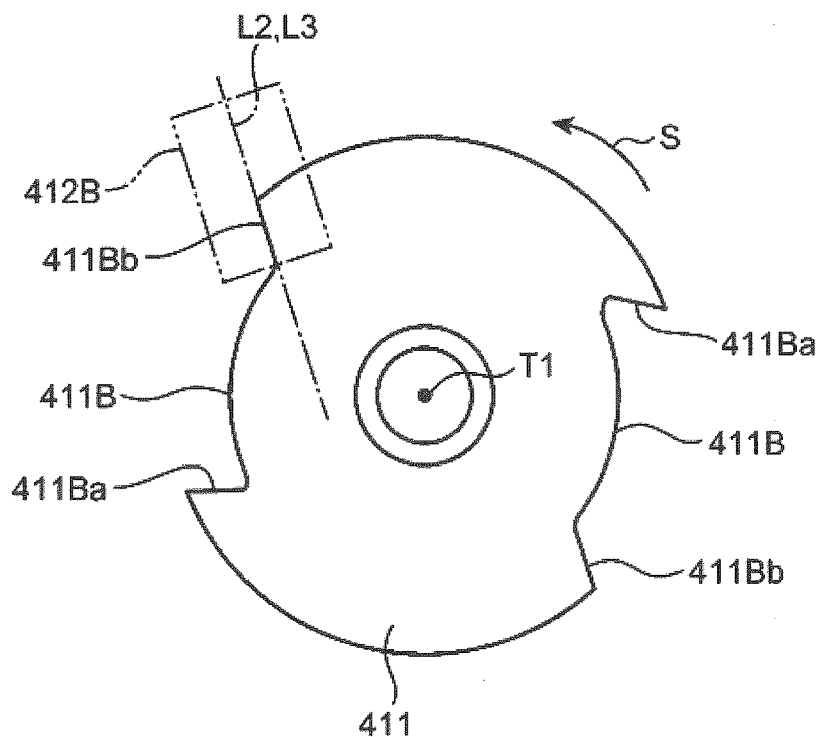
Figure 8:
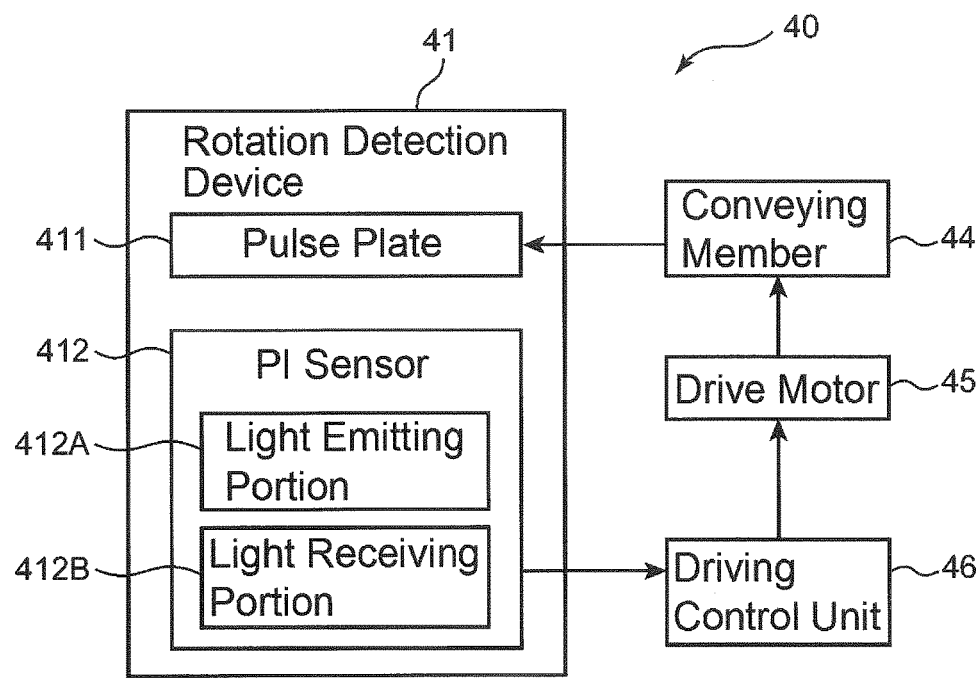
FIG. 8 illustrates a configuration of the toner conveyance device according to the one embodiment.

The following describes the toner conveyance device 40 in detail with reference to FIGS. 2 to 8. FIG. 2 illustrates a configuration of the toner conveyance device 40 according to the one embodiment. FIG. 3 illustrates an enlarged main part of the toner conveyance device 40 according to the one embodiment. FIG. 4 illustrates an enlarged main part of the toner conveyance device 40 according to the one embodiment. FIG. 5 illustrates an enlarged proximity of a rotation detection device 41 included in the toner conveyance device 40 according to the one embodiment. FIG. 6 illustrates a configuration of the rotation detection device 41 according to the one embodiment. FIGS. 7A and 7B illustrate locations with respect to a pulse plate of a PI sensor at the rotation detection device 41 according to the one embodiment. FIG. 8 illustrates a configuration of the toner conveyance device 40 according to the one embodiment.

The toner conveyance device 40 includes a toner conveyance passage 42, a wall portion 43, a conveying member 44, a drive motor 45, the rotation detection device 41, and a driving control unit 46. Toner is conveyed into the toner conveyance passage 42. The wall portion 43 has an inner wall surface 43A that defines this toner conveyance passage 42. The conveying member 44 extends to be located in the toner conveyance passage 42. The drive motor 45 generates driving power that rotates the conveying member 44. The rotation detection device 41 detects the rotation of the conveying member 44. The driving control unit 46 controls operation of the drive motor 45. The toner conveyance device 40, which is arranged between the toner container 30 and the developing device 20 in a toner conveying path from the toner container 30 to the developing device 20, conveys the toner housed in the toner container 30 to the developing device 20 via the toner conveyance passage 42.

The wall portion 43 is formed in a long shape that extends in a predetermined one direction. An internal space surrounded by the inner wall surface 43A will be the toner conveyance passage 42. At one end portion in a longitudinal direction of the wall portion 43, a toner flow-in opening 43B connected to the toner container 30 is formed. At another end portion in the longitudinal direction of the wall portion 43, a toner discharge opening 43C connected to the developing device 20 is formed.

The drive motor 45 is a motor exemplified by a DC brush motor, a DC brushless motor, and a stepper motor. The drive motor 45 includes a motor output shaft 45A from which rotary drive power is output. A worm 451 is installed on this motor output shaft 45A.

The conveying member 44 includes a rotation shaft 441 and a spiral fin 442. The rotation shaft 441 extends in a straight line in the toner conveyance passage 42. The spiral fin 442 is configured to rotate concentrically and integrally with this rotation shaft 441. At one end portion in an axial direction of the rotation shaft 441 of the conveying member 44, a conveyance gear 443 is configured to rotate integrally with the rotation shaft 441. The conveyance gear 443 is engaged with the worm 451 secured to the motor output shaft 45A of the drive motor 45. If the drive motor 45 rotates, its rotary drive power is transmitted to the rotation shaft 441 of the conveying member 44 via the motor output shaft 45A, the worm 451, and the conveyance gear 443 to rotate the rotation shaft 441. At the conveying member 44, the spiral fin 442 rotates in conjunction with the rotation of the rotation shaft 441. The conveying member 44 conveys the toner that has flowed in the toner conveyance passage 42 from the toner container 30 via the toner flow-in opening 43B toward the toner discharge opening 43C by the rotation of the spiral fin 442.

The rotation detection device 41 is a device for detecting rotation centering a rotation shaft of a rotator including the rotation shaft. In this embodiment, the rotation detection device 41 detects rotation centering the rotation shaft 441 at the conveying member 44 as a rotator. The rotation detection device 41 includes a pulse plate 411, which is an exemplary light-passing control member, and a Photo Interrupter Sensor (PI sensor) 412.

The pulse plate 411 is a disc-shaped member configured to rotate concentrically and integrally with the rotation shaft 441 of the conveying member 44. In this embodiment, the pulse plate 411 is integrally formed with the conveyance gear 443 at the one end portion in the axial direction of the rotation shaft 441 at the conveying member 44. The pulse plate 411 rotates in a predetermined rotation direction S in conjunction with the rotation centering the rotation shaft 441 of the conveying member 44 to control light-passing from a light emitting portion 412A, which is described later, at the PI sensor 412.

The pulse plate 411 includes a light shielding portion 411A and a light-passing opening 411B. The light shielding portion 411A is formed in a disc-shape. The light-passing opening 411B is formed by passing through this light shielding portion 411A in a thickness direction to pass through the light from the light emitting portion 412A. At the pulse plate 411, the formation number of the light-passing openings 411B is not particularly limited, and is selectable from any number. In this embodiment, as illustrated in FIG. 6, the pulse plate 411 includes two light-passing openings 411B formed at equiangular intervals in a circumferential direction. At the pulse plate 411, formation positions of the light-passing openings 411B are not particularly limited, and are selectable from any positions at the light shielding portion 411A. In this embodiment, as illustrated in FIG. 6, at the pulse plate 411, the light-passing opening 411B is formed in an elongated hole shape being notched from an outer peripheral edge in a radial direction to an inner side in the radial direction to extend along the circumferential direction in the disc-shaped light shielding portion 411A.

The light-passing opening 411B of the pulse plate 411 has a first opening margin 411Ba, a second opening margin 411Bb, and a third opening margin 411Bc. The first opening margin 411Ba is located at a downstream side of the rotation direction S in the circumferential direction. The second opening margin 411Bb is located at an upstream side of the rotation direction S in the circumferential direction. The third opening margin 411Bc connects end portions of the respective inner sides in the radial direction of the first opening margin 411Ba and the second opening margin 411Bb. At the light-passing opening 411B of the pulse plate 411, the first opening margin 411Ba and the second opening margin 411Bb each form one straight line. At the light-passing opening 411B of the pulse plate 411, the third opening margin 411Bc has an arc-shape forming a part of a concentric circle with an outer peripheral circle constituting an outer shape of the disc-shaped light shielding portion 411A.

Then, as illustrated in FIG. 6, in plan view viewing the pulse plate 411 from the axial direction of the rotation shaft 441, a first virtual extended line L1, which extends the first opening margin 411Ba at the light-passing opening 411B of the pulse plate 411, is set so as not to pass through a rotational center T1 of the pulse plate 411, that is, so as to pass through a position shifted from the rotational center T1. Further, in plan view viewing the pulse plate 411 from the axial direction of the rotation shaft 441, a second virtual extended line L2, which extends the second opening margin 411Bb at the light-passing opening 411B of the pulse plate 411, is set so as not to pass through the rotational center T1 of the pulse plate 411, that is, so as to pass through a position shifted from the rotational center T1. Then, at the light-passing opening 411B of the pulse plate 411, the first virtual extended line L1 and the second virtual extended line L2 intersect at the inner side in the radial direction of the pulse plate 411.

The PI sensor 412 is a sensor for detecting the rotation centering the rotation shaft 441 of the conveying member 44. This PI sensor 412 includes the light emitting portion 412A and a light receiving portion 412B. The light emitting portion 412A and the light receiving portion 412B are located opposed to one another with across the pulse plate 411. At the PI sensor 412, the light emitting portion 412A may be that one light source that emits diffusion light is arranged, or may be that a plurality of light emitting elements are arranged in line.

At the PI sensor 412, the light receiving portion 412B has a light receiving surface 412Ba. The light receiving surface 412Ba receives the light emitted from the light emitting portion 412A to pass through the light-passing opening 411B corresponding to the rotation of the pulse plate 411. At the light receiving portion 412B, a plurality of light receiving elements 412Bb are arranged along a predetermined first direction H on the light receiving surface 412Ba. That is, the light receiving portion 412B is formed such that the plurality of light receiving elements 412Bb are arranged along the predetermined first direction H. As illustrated in FIG. 6, in plan view viewing the pulse plate 411 from the axial direction of the rotation shaft 441, a light-receiving-portion center line L3 along the first direction H passing through the respective light receiving elements 412Bb at the light receiving portion 412B is set so as not to pass through the rotational center T1 of the pulse plate 411, that is, so as to pass through a position shifted from the rotational center T1. At the PI sensor 412, the light receiving portion 412B adds signals output from the respective light receiving elements 412Bb, based on the light received by the respective light receiving elements 412Bb, to output it as a light receiving signal from the light receiving portion 412B. The light receiving signal output from the light receiving portion 412B is a pulse-shaped signal to be a detection signal representing a detection result of the rotation by the conveying member 44.

At the rotation detection device 41 configured as described above, in plan view viewing the pulse plate 411 from the axial direction of the rotation shaft 441, each of the first opening margin 411Ba and the second opening margin 411Bb at the light-passing opening 411B of the pulse plate 411 does not extend along the radial direction of the pulse plate 411. The first virtual extended line L1 and the second virtual extended line L2, which extend the first opening margin 411Ba and the second opening margin 411Bb, are set so as not to pass through the rotational center T1 of the pulse plate 411, that is, so as to pass through positions shifted from the rotational center T1. Further, the light receiving portion 412B does not extend along the radial direction of the pulse plate 411. The light-receiving-portion center line L3 is set so as not to pass through the rotational center T1 of the pulse plate 411, that is, so as to pass through a position shifted from the rotational center T1. In view of this, it is possible to configure the rotation detection device 41 to be installed in a small installation space compared with typical techniques.

As illustrated in FIG. 7A, at the rotation detection device 41 in this embodiment, the light receiving portion 412B is arranged such that the first virtual extended line L1 corresponds to the light-receiving-portion center line L3 when the first opening margin 411Ba passes through an optical path from the light emitting portion 412A to the light receiving portion 412B at the PI sensor 412, by the rotation of the pulse plate 411. In view of this, the light receiving signal output from the light receiving portion 412B, based on the light that has passed through the light-passing opening 411B corresponding to the rotation of the pulse plate 411 in conjunction with the rotation of the conveying member 44, will be a pulse signal whose launch is steep. This does not cause depression of rotation detectivity when detecting the rotation of the conveying member 44 by using the light receiving signal output from the light receiving portion 412B.

As illustrated in FIG. 7B, at the rotation detection device 41 in this embodiment, the light receiving portion 412B is arranged such that the second virtual extended line L2 corresponds to the light-receiving-portion center line L3 when the second opening margin 411Bb passes through the optical path from the light emitting portion 412A to the light receiving portion 412B at the PI sensor 412, by the rotation of the pulse plate 411. With such configuration, the light receiving signal output from the light receiving portion 412B, based on the light that has passed through the light-passing opening 411B corresponding to the rotation of the pulse plate 411 in conjunction with the rotation of the conveying member 44, will be a rectangular-shaped pulse signal whose launch and trailing edge are steep. This ensures more improving the rotation detectivity when detecting the rotation of the conveying member 44 by using the light receiving signal output from the light receiving portion 412B.

In this embodiment, as described above, the two light-passing openings 411B are formed at the pulse plate 411, thus during one rotation of the pulse plate 411 in conjunction with the rotation of the conveying member 44, the light-passing opening 411B passes through the optical path from the light emitting portion 412A to the light receiving portion 412B twice. In view of this, the light receiving signal output from the light receiving portion 412B at the PI sensor 412 will be a rectangular wave signal including two pulses per cycle during one rotation of the pulse plate 411. This ensures a further improved rotation detectivity when detecting rotation of a rotator by using a light receiving signal output from a light receiving portion.

At the toner conveyance device 40 in this embodiment, the driving control unit 46 includes a Central Processing Unit (CPU), a Read Only Memory (ROM), a Random Access Memory (RAM), and similar portion. The CPU executes control required for operating the toner conveyance device 40 with respect to the above-described hardware constituting the toner conveyance device 40. The ROM stores software required for controlling the operation of the toner conveyance device 40. The RAM is used for, for example, storing temporarily data that occurs in execution of the software and storing application software. The driving control unit 46 controls the operation of the drive motor 45 based on the light receiving signal output from the light receiving portion 412B at the PI sensor 412 of the rotation detection device 41.

When the image forming operation is performed at the image forming apparatus 10 to consume the toner in the developing device 20, the driving control unit 46 determines whether it is necessary to convey the toner to the developing device 20 via the toner conveyance passage 42 at the toner conveyance device 40 or not. This determination, for example, may be performed based on an amount of toner consumption calculated by the driving control unit 46 by using the light receiving signal output from the light receiving portion 412B at the PI sensor 412. This determination also may be performed based on an amount of toner consumption calculated by the driving control unit 46 by using a signal regarding a toner density or a toner amount from a toner sensor located in the developing device 20.

As a result of the above-described determination, when the driving control unit 46 determines that it is necessary to convey the toner to the developing device 20 via the toner conveyance passage 42 at the toner conveyance device 40, the driving control unit 46 outputs a driving instruction signal to the drive motor 45, thus the drive motor 45 rotationally drives. If the drive motor 45 rotates, its rotary drive power is transmitted to the conveying member 44 via the motor output shaft 45A, the worm 451, and the conveyance gear 443. Consequently, the conveying member 44 rotates centering the rotation shaft 441. Thus, if the conveying member 44 rotates, the spiral fin 442 conveys the toner into the toner conveyance passage 42 to supply the toner from the toner discharge opening 43C to the developing device 20.

Here, when the driving control unit 46 receives the light receiving signal from the light receiving portion 412B at the PI sensor 412 of the rotation detection device 41 after the driving control unit 46 outputs the driving instruction signal to the drive motor 45, the driving control unit 46 determines that the conveying member 44 at the toner conveyance device 40 normally rotates to continue the rotation driving operation of the drive motor 45. When the driving control unit 46 does not receive the light receiving signal from the light receiving portion 412B at the PI sensor 412 of the rotation detection device 41 even though a predetermined time has passed after the driving control unit 46 outputs the driving instruction signal to the drive motor 45, the driving control unit 46 determines that the conveying member 44 at the toner conveyance device 40 does not normally rotate to transmit a driving stop signal to the drive motor 45, thus stopping the drive motor 45.

The toner conveyance device 40 configured as described above ensures detection of the rotation of the conveying member 44 by using the light receiving signal output from the light receiving portion 412B, based on the light that has passed through the light-passing opening 411B corresponding to the rotation of the pulse plate 411 in conjunction with the rotation of the conveying member 44, in the toner conveyance passage 42. This rotation detection device 41 that detects the rotation of the conveying member 44 has a configuration that can be installed in the small installation space as described above, thus ensuring downsizing the toner conveyance device 40.

The image forming apparatus 10 in this embodiment ensures the detection of the rotation of the conveying member 44 by the rotation detection device 41, at the toner conveyance device 40 that conveys the toner to the developing device 20 for forming the toner image on the photoreceptor drum 121. This rotation detection device 41 that detects the rotation of the conveying member 44 has a configuration that can be installed in the small installation space as described above, thus ensuring downsizing the image forming apparatus 10.

The rotation detection device 41, and the toner conveyance device 40 and the image forming apparatus 10 including this according to the embodiments of the disclosure is described above; however, the disclosure is not limited to this. The disclosure can employ, for example, the following modified embodiments.

(1) In the above-described embodiment, the description has been given of the copier as the image forming apparatus 10 as the example. However, the disclosure is not limited to that the image forming apparatus 10 is the copier. The image forming apparatus 10 may be a printer that performs a printing process based on image information input from an external device such as a computer, or may be a facsimile device that outputs an image based on image information transmitted via a communication line. The image forming apparatus 10 may be a device that performs an image formation process for forming a color image. When the image forming apparatus 10 forms the color image, the image forming apparatus 10 includes four developing devices 20 that develop by using four color toners: cyan (C), magenta (M), yellow (Y), and black (Bk), and four toner conveyance devices 40 corresponding to the respective four developing devices 20. Then, it is only necessary that each toner conveyance device 40 has a configuration that includes the rotation detection device 41.

(2) In the above-described embodiment, the rotation detection device 41 is configured to detect the rotation of the conveying member 44 at the toner conveyance device 40 that functions as the intermediate hopper, which conveys the toner housed in the toner container 30 to the developing device 20. However, the rotation detection device 41 is not limited to such configuration. The rotation detection device 41 is the device that detects the rotation centering the rotation shaft of the rotator including the rotation shaft, thus various rotators included in the image forming apparatus 10 can be detection targets at the rotation detection device 41. For example, the rotation detection device 41 can have a configuration that detects rotation of a stir conveying member, as a rotator, that conveys the toner with stirring at the toner container 30. In this case, the toner container 30 is a toner conveyance device, and the pulse plate 411 is configured to rotate integrally with a rotation shaft of the stir conveying member included in the toner container 30, at the rotation detection device 41.

A drive motor that generates driving power that rotates the various rotators included in the image forming apparatus 10 can be treated as a rotator. In this case, the pulse plate 411 is configured to rotate integrally with a motor output shaft of the drive motor, at the rotation detection device 41. For example, the rotation detection device 41 may include the pulse plate 411 configured to rotate integrally with the motor output shaft 45A of the drive motor 45 included in the toner conveyance device 40 to detect the rotation of the drive motor 45.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A rotation detection device that detects rotation centering a rotation shaft of a rotator including the rotation shaft, the rotation detection device comprising:
a light emitting portion that emits light;
at least one light-passing control member located to rotate integrally with the rotation shaft to rotate in conjunction with rotation of the rotator to control passing of the light from the light emitting portion, the light-passing control member including a light shielding portion and a light-passing opening through which the light from the light emitting portion passes; and
a light receiving portion located opposed to the light emitting portion across the light-passing control member, a plurality of light receiving elements receiving light that has passed through the light-passing opening corresponding to rotation of the light-passing control member, the plurality of light receiving elements being arranged along a first direction on the light receiving portion, and the light receiving portion outputting a light receiving signal based on the light received by the respective light receiving elements as detection signals representing detection results of the rotation by the rotator,
wherein a first opening margin at a downstream side of a rotation direction forms one straight line at the light-passing opening of the light-passing control member,
a first virtual extended line that extends the first opening margin and a light-receiving-portion center line along the first direction passing through the respective light receiving elements at the light receiving portion pass through positions shifted from a rotational center of the light-passing control member, in plan view viewing the light-passing control member from an axial direction of the rotation shaft, and the light receiving portion is arranged such that the first virtual extended line corresponds to the light-receiving-portion center line, when the first opening margin passes through an optical path from the light emitting portion to the light receiving portion by the rotation of the light-passing control member.

2. The rotation detection device according to claim 1, wherein a second opening margin at an upstream side of the rotation direction forms one straight line at the light-passing opening of the light-passing control member, a second virtual extended line that extends the second opening margin passes through a position shifted from the rotational center of the light-passing control member, in plan view viewing the light-passing control member from the axial direction of the rotation shaft, and the second virtual extended line corresponds to the light-receiving-portion center line, when the second opening margin passes through the optical path from the light emitting portion to the light receiving portion by the rotation of the light-passing control member.

3. The rotation detection device according to claim 1, wherein the at least one light-passing opening includes a plurality of light-passing openings formed at the light-passing control member.

4. A toner conveyance device comprising:

a toner conveyance passage into which toner is conveyed;

a wall portion having a wall surface that defines the toner conveyance passage;

a conveying member, as a rotator, that extends in the toner conveyance passage to convey toner with rotating;

a drive motor that generates driving power that rotates the conveying member;

the rotation detection device according to claim 1 that detects rotation of the conveying member; and a driving control unit that controls operation of the drive motor based on the light receiving signal output from the light receiving portion of the rotation detection device.

5. An image forming apparatus comprising:

an image carrier;

a developing device that supplies toner to the image carrier to form a toner image on the image carrier; and the toner conveyance device according to claim 4 that conveys toner to the developing device via the toner conveyance passage.

* * * * *